US 8,129,517 B1
Mar. 6, 2012

(12) United States Patent
Letuchy et al.

(54) LABELED SOLID SUPPORTS FOR ORGANIC SYNTHESIS

(75) Inventors: Yakov A. Letuchy, Iowa City, IA (US);
William E. Martin, Coralville, IA (US);
David W. Muller, Iowa City, IA (US);
Shawn Allen, Williamsburg, IA (US);
Shawn P. Walsh, Williamsburg, IA (US)

(73) Assignee: Integrated DNA Technologies, Inc., Skokie, IL (US)

( * ) Notice: Subject to any disclaimer, the term of this patent is extended or adjusted under 35 U.S.C. 154(b) by 391 days.

(21) Appl. No.: 11/751,126

(22) Filed: May 21, 2007

Related U.S. Application Data

(60) Provisional application No. 60/803,012, filed on May 23, 2006.

(51) Int. Cl.
*C07H 21/00* (2006.01)
*C08B 15/06* (2006.01)
*A61K 38/00* (2006.01)
*C07K 16/00* (2006.01)

(52) U.S. Cl. ........ 536/25.3; 536/30; 530/333; 530/391.1
(58) Field of Classification Search ................. 536/25.3, 536/30; 530/333, 391.1
See application file for complete search history.

(56) References Cited

U.S. PATENT DOCUMENTS

| | | | |
|---|---|---|---|
| 4,810,381 A | 3/1989 | Hagen et al. |
| 4,906,378 A | 3/1990 | Hagen et al. |
| 4,971,736 A | 11/1990 | Hagen et al. |
| 5,019,232 A | 5/1991 | Wilson et al. |
| 5,071,610 A | 12/1991 | Hagen et al. |
| 5,147,539 A | 9/1992 | Hagen et al. |
| 5,207,915 A | 5/1993 | Hagen et al. |
| 5,328,758 A | 7/1994 | Markell et al. |
| 5,415,779 A | 5/1995 | Markell et al. |
| 5,462,748 A | 10/1995 | Lloyd et al. |
| 5,492,627 A | 2/1996 | Hagen et al. |
| 5,558,771 A | 9/1996 | Hagen et al. |
| 5,589,586 A | 12/1996 | Holmberg |
| 5,595,649 A | 1/1997 | Markell et al. |
| 5,601,979 A | 2/1997 | Wong |
| 5,610,274 A | 3/1997 | Wong |
| 5,688,370 A | 11/1997 | Hagen et al. |
| 5,700,375 A | 12/1997 | Hagen et al. |
| 5,702,610 A | 12/1997 | Hagen et al. |
| 5,723,599 A | 3/1998 | Klem et al. |
| 5,734,020 A | 3/1998 | Wong |
| 5,904,848 A | 5/1999 | Wong et al. |
| 5,935,527 A | 8/1999 | Andrus et al. |
| 6,090,934 A | 7/2000 | Kumar et al. |
| 6,175,006 B1 | 1/2001 | Andrus et al. |
| 6,261,497 B1 | 7/2001 | Wong et al. |
| 6,590,092 B1 | 7/2003 | Ngo |

(Continued)

FOREIGN PATENT DOCUMENTS

WO 00/21658 A2 4/2000

*Primary Examiner* — Jezia Riley
(74) *Attorney, Agent, or Firm* — John A. Petravich

(57) ABSTRACT

The disclosed invention pertains to improved oligonucleotide manufacturing methods, including novel support compositions that are optionally labeled, their methods of preparation and use. The compositions and methods are particularly well suited for high throughput oligonucleotide manufacturing in that the automated support recognition facilitates loading of the wells with the proper supports. In addition, the labeled supports can be used to confirm that each well of a multi-well plate, such as a 96 or 384 well plate, was properly loaded.

18 Claims, 5 Drawing Sheets

Standard 96-Well Plate Loaded with Membranes

⊕ Membrane Type A
⊘ Membrane Type C
● Membrane Type G
● Membrane Type T

U.S. PATENT DOCUMENTS

| | | |
|---|---|---|
| 6,761,855 B1 | 7/2004 | Cook et al. |
| 7,635,772 B2 | 12/2009 | McCormac |
| 7,691,316 B2 | 4/2010 | Ngo et al. |
| 2003/0029787 A1 | 2/2003 | Liu et al. |
| 2003/0036066 A1 | 2/2003 | Pon et al. |
| 2004/0220397 A1 | 11/2004 | Leuck et al. |
| 2005/0281878 A1 | 12/2005 | Cowieson et al. |
| 2008/0021224 A1 | 1/2008 | Ravikumar et al. |
| 2009/0203897 A1 | 8/2009 | Larka et al. |

UV - 254nm
Results

| Pk # | Time | Height | Corr Area | Corr. Area% |
|---|---|---|---|---|
| 1 | 13.66 | 273 | 49 | 0.1 |
| 2 | 13.86 | 410 | 70 | 0.1 |
| 3 | 14.41 | 437 | 66 | 0.1 |
| 4 | 14.71 | 835 | 198 | 0.3 |
| 5 | 15.23 | 1208 | 265 | 0.4 |
| 6 | 15.36 | 342 | 59 | 0.1 |
| 7 | 15.48 | 649 | 96 | 0.1 |
| 8 | 15.65 | 371 | 57 | 0.1 |
| 9 | 15.83 | 695 | 162 | 0.2 |
| 10 | 16.15 | 851 | 143 | 0.2 |
| 11 | 16.62 | 1327 | 237 | 0.4 |
| 12 | 16.92 | 1539 | 287 | 0.4 |
| 13 | 17.05 | 849 | 140 | 0.2 |
| 14 | 17.26 | 1624 | 429 | 0.6 |
| 15 | 17.51 | 756 | 175 | 0.3 |
| 16 | 17.62 | 828 | 171 | 0.3 |
| 17 | 17.87 | 2222 | 492 | 0.7 |
| 18 | 18.15 | 1034 | 186 | 0.3 |
| 19 | 18.25 | 827 | 151 | 0.2 |
| 20 | 18.47 | 1375 | 320 | 0.5 |
| 21 | 18.68 | 511 | 55 | 0.1 |
| 22 | 18.85 | 681 | 79 | 0.1 |
| 23 | 19.12 | 494 | 95 | 0.1 |
| 24 | 19.21 | 715 | 113 | 0.2 |
| 25 | 19.44 | 2272 | 415 | 0.6 |
| 26 | 19.70 | 794 | 171 | 0.3 |
| 27 | 19.80 | 889 | 140 | 0.2 |
| 28 | 20.05 | 1404 | 390 | 0.6 |
| 29 | 20.42 | 1845 | 590 | 0.9 |
| 30 | 20.65 | 1300 | 336 | 0.5 |
| 31 | 20.82 | 1819 | 677 | 1.0 |
| 32 | 21.01 | 6223 | 2530 | 3.8 |
| 33 | 21.21 | 4649 | 713 | 1.1 |
| 34 | 21.45 | 168573 | 55385 | 83.7 |
| 35 | 21.64 | 3002 | 695 | 1.1 |
| 36 | 28.80 | 616 | 66 | 0.1 |

Figure 4B

SEQUENCE LISTING

<160> NUMBER OF SEQ ID NOS: 2

<210> SEQ ID NO 1
<211> LENGTH: 40
<212> TYPE: DNA
<213> ORGANISM: Artificial
<220> FEATURE:
<223> OTHER INFORMATION: Synthetic oligonucleotide to test support

<400> SEQUENCE: 1
aacctactct tgaactatct aatgatggct gatgccgacc                                    40

<210> SEQ ID NO 2
<211> LENGTH: 20
<212> TYPE: DNA
<213> ORGANISM: Artificial
<220> FEATURE:
<223> OTHER INFORMATION: Synthetic 20-mer oligonucleotide to test
      support

```
<400> SEQUENCE: 2
gcacttcagg ctcctgggcc                                              20
```

LABELED SOLID SUPPORTS FOR ORGANIC SYNTHESIS

CROSS-REFERENCE TO RELATED APPLICATION

The present application claims priority under 35 U.S.C. §119(e) to U.S. provisional patent application No. 60/803,012 filed 23 May 2006. The entire teachings of the above application are incorporated herein by reference.

FIELD OF THE INVENTION

The invention pertains to improved organic synthesis methods, including oligonucleotide manufacturing methods, novel labeled support compositions, and their methods of preparation and use. The compositions and methods are particularly well suited for high throughput oligonucleotide manufacturing in that the automated support recognition facilitates loading of the wells with the proper supports. In addition, the labeled supports can be used to confirm that each well of a multi-well plate, such as a 96 or 384 well plate, was properly loaded.

BACKGROUND OF THE INVENTION

Synthetic oligonucleotides have been an integral part of scientific research for the last twenty-five years, but initial methods of oligonucleotide synthesis were very labor-intensive. Organic synthesis on solid supports was pioneered by Merrifield, R. B. (See Journal of the American Chemical Society, 85:2149, for protein synthesis on solid supports). Advances in automation of oligonucleotide synthesis began in the early 1980's when reaction columns containing solid support were employed (Bender et al., U.S. Pat. No. 4,353,989). Oligonucleotide synthesizers were developed that added the necessary reagents to several reaction columns simultaneously. The synthesis of a typical 20-mer oligonucleotide can take several hours, and the first generation synthesizers typically ran no more than four columns. High throughput synthesis required either a great deal of time or a significant amount of synthesizers. When using these synthesizers, a technician will place a known amount of a support derivatized with the corresponding base into a column that will be used for oligomer synthesis.

Currently, methods have advanced to enable a technician to load multi-well plates wherein each well operates as a reaction column (McGraw et al., U.S. Pat. No. 5,368,823). With the automated synthesizers such as described in McGraw, a technician manually loads each of the 96 wells with one of the four synthesis membrane supports that correspond to the four possible bases that are pre-attached to the support.

The multi-well plate synthesizer is a major advancement in reducing the amount of instrumentation required for high throughput synthesis, and they also can potentially minimize the amount of reagents used in the synthesis of oligonucleotides. The reagents used are expensive, and the loss of reagent through waste or error can significantly increase the cost of the synthesis of an oligonucleotide. Any methods that would minimize the amount of reagents required to be present in a given well at a given cycle and/or used in multiple cycles would enhance the synthesizer's performance and minimize cost. Additionally, the removal of any procedures in the current state of the art that increase the likelihood of error in the synthesis would be advantageous. These steps include the loading of the derivatized supports to the respective column. As mentioned above, there are typically four different derivatized supports for each DNA or RNA synthesis that correspond to the four different deoxy- or ribonucleotide bases respectively. For either DNA or RNA synthesis, the four different types of supports are visually indistinguishable, and a support for RNA synthesis would be indistinguishable from a support for DNA synthesis. Any errors in the placement of the supports into the column will not be noticed until after the synthesis is complete.

To support oligonucleotide synthesis, either high throughput such as with 96 or 384-well plates or in smaller-scale throughput, methods and compositions are needed that reduce the likelihood of errors in oligonucleotide synthesis.

The proposed invention provides compositions and methods that reduce the likelihood of error during organic synthesis on solid supports, including oligonucleotide synthesis. The invention also provides a novel high-throughput oligonucleotide synthesizing format with color-coded supports that provide a more efficient and an error-free method of loading the initial base-containing supports into the synthesis wells of plates or individual columns. The invention also provides a method for verification of the loaded wells. These and other advantages of the invention, as well as additional inventive features, will be apparent from the description of the invention provided herein.

BRIEF SUMMARY OF THE INVENTION

The disclosed invention provides a format for the use of solid supports for organic synthesis with a detectable cue for an accurate loading of the supports to the reaction wells, as well as facilitating methods for automatically verifying that the correct supports were loaded into the format.

In one embodiment, membranes containing oligonucleotide synthesis supports are made from either completely or partially derivatized supports and thermoplastic polymeric powders. The membranes minimize the required quantity of reagents and allow for automated handling of the supports. Membranes with partially derivatized supports can be further derivatized to have a functional group, such as a first base of a future oligonucleotide, an extendable 3' modifier or a universal linking moiety attached to them. The membranes can optionally contain a detectable cue.

In another embodiment, the detectable cue is a visible cue, typically using a color-labeling scheme. One embodiment involves labeling the support through a color indicator, such as a colored particle or dye, added to the support before the support is loaded into the well of a plate or column. Alternatively, the colored membranes could be manufactured using either specific dyes for colorless or insufficiently colored (for example, off-white) articles, or colored particles such as polymers added to the initial powder mix. Properties of dyes and colored particles and methods of their addition should be selected to provide labeling but prevent any negative effect on product quality, either by presence of their components in oligonucleotides or by side reactions. For example, a preferred dye would be washed away completely during the synthesis steps preceding cleavage or remain on the support during the oligonucleotide cleavage from the support. In any event, the labeling does not affect the quality of the synthesized oligonucleotide.

The supports can be controlled pore glass, porous polystyrene or other supports, or a combination thereof, or mixtures of controlled pore glass and/or porous polystyrene with polystyrene, polyethylene, Teflon®, polypropylene, or similar materials. In addition, the coloring method could be used with controlled pore glass, porous polystyrene or other supports, or a combination thereof. Additional materials such as liquids (e.g., acetonitrile or diethyleneglycol monoethyl ether acetate) can be added to the colored materials to saturate or otherwise assist in distinguishing the color of the dyed product.

The labeling could be utilized in small or large-scale synthesis or high throughput synthesis. The correct positioning or placement can be verified visually by a technician. In another embodiment, the loaded plates or individual columns can be color-scanned and evaluated by a suitable computer program to verify proper loading. A suitable program could, for example, access information in a database containing the correct loading information and compare that information with the scan to verify that the two were the same.

BRIEF DESCRIPTION OF THE DRAWINGS

FIG. 4B is the numerical data illustrated in FIG. 4A. The trace offers additional evidence of the purity of an oligomer synthesized using supports of the current invention.

DETAILED DESCRIPTION OF THE INVENTION

The disclosed invention provides a format with several novel features that reduce the cost and improve the accuracy of organic synthesis on solid supports. The format provides novel synthesis supports as well as a detectable cue for an accurate loading of the supports to the reaction wells, and it also facilitates methods for automatically verifying that the correct supports were loaded into the format.

The term "membrane support system" refers to a combination of the membrane that supports oligonucleotide synthesis and the restrictive frit. The membrane or restrictive frit can optionally be labeled, and the membrane can be used without the restrictive frit.

The term "functional group" refers to any component linked or attached to a support, wherein the functional group may not be readily detectable except through the use of detectable cues. Alternatively, the functional group, such as a dye, may act as a detectable cue.

The detectable cue can be a visual cue (such as color, shape, size or a marking system), a radio-frequency identifier, an antibody tag, a chemical or radioactive detection system, a magnetic identifier, a multi-colored tag, a fluorescent additive, a phosphorescent additive, or any other general method or composition used to distinguish two or more otherwise similar objects. The term "tagging component" is used interchangeably with "detectable cue".

Figure 1:
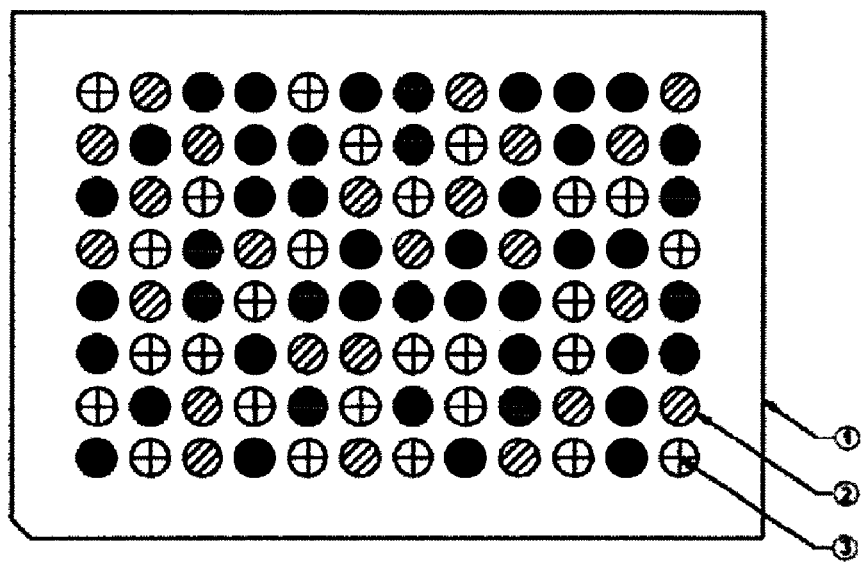
FIG. 1 is a diagram of a standard 96-well synthesis plate depicting a fully loaded plate with the four standard derivatized membranes.
Figure 2:
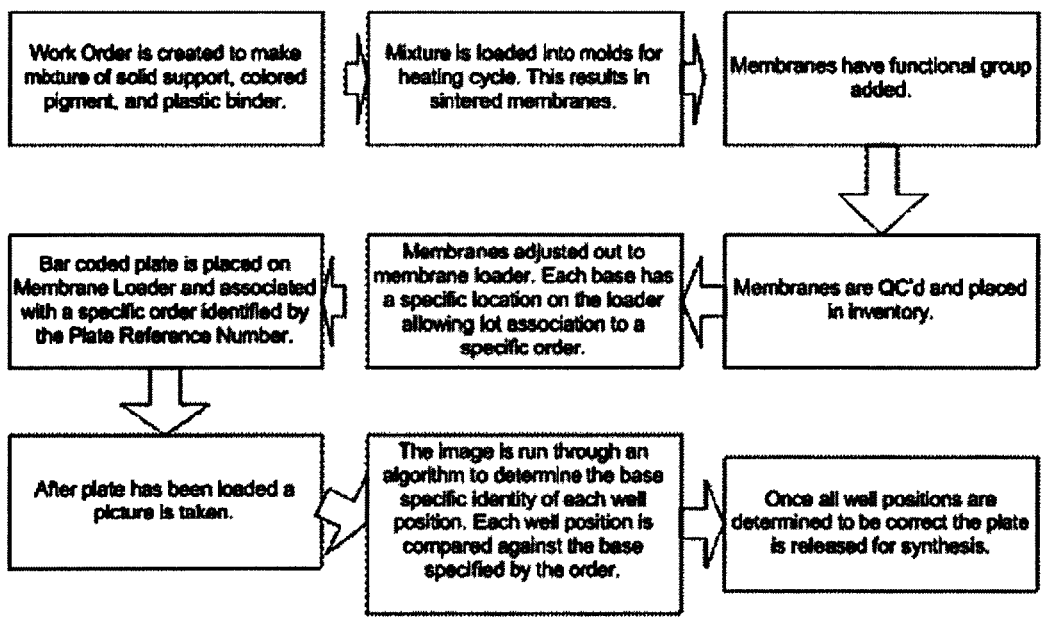
FIG. 2 is a flowchart of an automated membrane-loading process.

In one embodiment, the detectable cue is a visible cue. The visible cue could be through the utilization of a color-labeling scheme. As represented in FIG. 1, one embodiment involves labeling the support 3 through a color indicator, such as colored particles or a dye, to the support before the support is loaded into the well 2 of a plate 1 or column. Alternatively, the membranes could be distinguished by being colorless or insufficiently colorized (for example, off-white). For example, one novel colorless support is comprised of ultra-high molecular weight (UHMW) polyethylene (PE) and CPG. In another embodiment, a novel support that can be optionally colorless is a combination of CPG, a lower molecular weight PE (relative to UHMW PE) as a binder and optionally UHMW PE. Suitable coloring compounds include protein stains such as Brilliant Green and Brilliant Blue for A and T, respectively, and pH indicators Methyl Red and Alizarin for C and G, respectively. The membranes can be kept slightly wet in solvent to saturate the color to increase visibility and to facilitate the removal of any incorporated dyes.

These color indicators are available commercially, and they are merely examples of the near limitless combinations of colors that can be combined with the different supports. The invention provides a ready method for assessing that the appropriate starting unit has been used for a multi-step synthesis, and therefore could be useful for other synthetic processes on solid supports such as peptide synthesis or combinatorial chemistry. There are enough colors available, for example, to differentiate 20-plus amino acids for peptide synthesis, or to differentiate supports with the same functional groups loaded at varying scales. In another embodiment, the color-coding system can be used to differentiate supports with different universal linkers.

As an alternative to dyes, the colored supports could be manufactured using colored particles such as polymers. This method would avoid any potential side reactions that could occur between a dye that did not wash away and any reagents or the oligonucleotide itself, and it avoids the potential presence of incompletely washed-away dye in the oligonucleotide after it is cleaved from a support. The labeling does not negatively affect the quality of the synthesized oligonucleotide in a significant manner.

The supports can be mixtures of controlled pore glass or porous polystyrene with polystyrene, polyethylene, Teflon®, polypropylene, or similar materials. In addition, the coloring method could be used with controlled pore glass (CPG), porous polystyrene or other supports, or a combination thereof. Additional materials such as liquids (acetonitrile, diethyleneglycol monoethyl ether acetate) can be added to the colored materials to enhance or deepen the color of the polymer. In one embodiment, colored powder is combined with UHMW PE and CPG. In another embodiment, linear low molecular weight PE is added to UHMW PE, CPG and a colored powder to act as a binder. In another embodiment, a colored powder can be added to CPG in a clear or translucent column, and the coloring can be detected visually by a technician or by recognition software. The colored powder can comprise as little as one percent or less of the total composition in the column, thereby having no or negligible effects on the reaction while still being detectable.

The labeling could be utilized in small scale, high throughput synthesis or large-scale synthesis. The correct placement or positioning of the supports can be verified visually by a technician. In another embodiment, the loaded plates or individual columns can be color-scanned and evaluated by a suitable computer program to verify proper loading. A suitable program could, for example, access information in a database containing the correct loading information and compare that information with the scan to verify that the two were the same. When using dyes or soluble colored particles, once a plate is verified, the dye or colored particles can be washed away. Any suitable method for washing the dye away can be used. For example, the dye can be washed away by placing it in a synthesizer and washing it with a suitable solvent or it could be washed prior to placing it in a synthesizer.

In one embodiment of automated recognition software, a digital camera is attached to a computer and operated by remote control from the computer. The camera takes a photograph of the plate of membranes and sends the photo to the computer. The computer software analyzes the photo to determine the color classification of each membrane. From the color classification, the software determines the base of each membrane. For example, blue, green, red and yellow can correspond to the bases T, A, C and G. The bases for each membrane position are then compared to the desired bases to determine if the support loading is correct.

In another embodiment of the automated recognition software, a 10 megapixel digital camera connected to a computer and operated by a remote control from the computer software takes a photo of the plate of membranes. The camera uses a flash and is preset in manual mode to yield consistent results with varying ambient lighting and membrane color composition. The camera is set for its lowest resolution of 640×480 pixels, which is sufficient for this application. The image is sent to the computer where it is analyzed by the computer software. After calibration, the computer software knows the location of each of the 96 wells in the plate containing the membranes. The software samples 25 pixels in a 5×5 square from the image at the center of each well location. The color saturation and hue of each of these pixels is determined from its RGB components. The hue and saturation are plotted on a 2-D polar plot, where saturation is the distance from the center, and hue is the angle around the center from the x-axis. During calibration with sample colored membranes, lines are drawn around populations of color points to define regions corresponding to individual colors. During analysis, each of the 25 sample pixels from each membrane is analyzed to determine which region of color it falls into. The color corresponding to the region containing the most sample pixels of the 25 is declared to be the color of the membrane. This majority rule algorithm renders the analysis insensitive to individual specs of colors or random highlights picked up in the photograph. The software calibration process is required only once after the camera is mounted or the colors of the membranes are changed.

The color-coded membrane reduces the likelihood of errors in the synthesis process, thereby increasing the efficiency and lowering the cost of the synthesis. When the membrane is used in tandem with a restrictive frit, the cost of synthesis is reduced even further. Likewise, the restrictive frit could be used with the color-coded support as well as a traditional or alternative supports that are used for oligonucleotide synthesis. The restrictive frit, or the entire membrane system, could be color-coded to help specify the type of restrictive frit, i.e. to specify restriction.

Typically, each cycle in the oligonucleotide synthesis requires its respective reagents to be present for a given amount of time (the times and reagents for the cycles of oligonucleotide synthesis are well-known in the art). The denser restrictive frit will achieve a slower flow of the reagent through the membrane where the synthesis occurs, thereby keeping the membrane immersed in reagent for a longer period of time. In one embodiment, the restrictive frit allows a given reagent, in the absence of a vacuum pressure, to flow through the frit at a slow pace rather than completely prohibiting flow. This would enable the reagent to continually move through the solid support membrane, maximizing the occurrence of reactions within the membrane. The frit allows for oligonucleotide synthesis that maximizes the quality and quantity of the oligonucleotides without the need to regulate the reagent flow rate by more complicated means. In one embodiment, the restrictive frit is placed underneath the color-coded membrane. The reagents are added to the color-coded membrane from above the membrane, and the reagent moves through the membrane through gravity or a vacuum or pneumatic pressure. The density of the restrictive frit prevents the reagents from flowing through the membrane support system (i.e. the membrane and the frit) at a higher rate than it normally would if the fit was not present, and therefore less reagent can be added to each cycle than would normally be added without the presence of the restrictive frit.

The restrictive fit can be made through a variety of polymers or compositions that are combined to form a material more dense than the membrane that supports the oligonucleotide synthesis. In one embodiment, the restrictive frit is composed of UHMW PE.

In one embodiment, the restrictive frit is placed inside any well or column that is known in the art. The plate containing the wells or columns with the membranes can be manually or automatically verified for correct loading, through the use of the detectable cue, and then loaded into the synthesizer.

The following examples further illustrate the invention but, of course, should not be construed as in any way limiting its scope. In particular the following examples demonstrate synthetic methods for obtaining the compounds of the invention. Starting materials useful for preparing the compounds of the invention and intermediates thereof, are commercially available or can be prepared from commercially available materials using known synthetic methods and reagents. All oligonucleotide sequences are written from the 5'-terminus on the left to the 3'-terminus on the right.

EXAMPLE 1

Manufacturing of Supports

This example demonstrates the manufacturing of non-colored or color-coded supports.

Manufacturing of non-colored membranes: 158.42 g of Microthene® ground polyolefin powder—low density polyethylene MN-710-20 from Equistar, fraction 75-180 µm, 63.85 g of dT CPG (CPG, Inc.) loaded to about 19.8 nmol/mg with 5'-Dimethoxytrityl Thymidine (dT), and 48.04 g of a 125-180 µm fraction of UHMW PE from Ticona Engineering Polymers were tumbled inside a container for 30 min at 20 rpm. The mixture was packed into wells in a Teflon®-coated aluminum plate. The plate was covered with another plate without wells, the plates were clamped together, heated for about 20 minutes to about 108° C. in an oven preheated to 175° C. and then cooled to 40° C. or lower temperature. The resulting membranes were removed from the plate by compressed air. The final average dT loading of the white to off-white membranes was 66.6 nmol by trityl analysis. The heating parameters were established in preliminary experiments and dependent upon plate weights, oven characteristics and powder composition.

Coloring procedure: 720 ml of a solution of 0.0759 g of Brilliant blue R dye in 7:3 vol. diethyleneglycol monoethyl ether acetate—acetonitrile was added to the 265 g of dT membranes, the mixture shaken for 5 min, and then drained. The membranes were dried in vacuum until there was no weight change during after an hour of drying. Blue membranes were stored at ~−20° C. It was believed that most of the diethyleneglycol monoethyl ether acetate remained in the pores, thus deepening the membrane color. If acetonitrile was used as the solvent, the membranes could be removed from vacuum and stored before all of the acetonitrile evaporated.

Color-coding of Memstar membranes from (CPG, Inc.): White Memstar membranes with dT loading of 200 or 40 nmol were colored separately with Brilliant Blue dye as described above. They were then dried briefly in a nitrogen flow to remove excess solvent. Both sets of blue Memstar membranes were used for oligonucleotide synthesis and lost their blue color within 9 synthesis steps.

Permanently colored membranes: 450 g of LCAA CPG, 1590 g of UHMW polyethylene 5382W from Shamrock Technologies, and 17 g of 75-180 µm fraction of Scarlet Red plastic beads from Innotek Technologies, were mixed for 30 min at 20 rpm in a sealed container. After the mixture was packed into the wells of plates as described above, covered with flat plates and the molds heated gradually to about 186° C. to about 189° C. for about 25 to 35 minutes and cooled, the light-red colored membranes were removed by compressed air. Repeating the above procedure produced about 150,000 membranes that were derivatized with 5''-Dimethoxytrityl-N-benzoyl-Deoxycytidine-3'-O-succinyl hemiester to the loading of at least 50 nmol/membrane as determined by trityl analysis.

Figure 3:
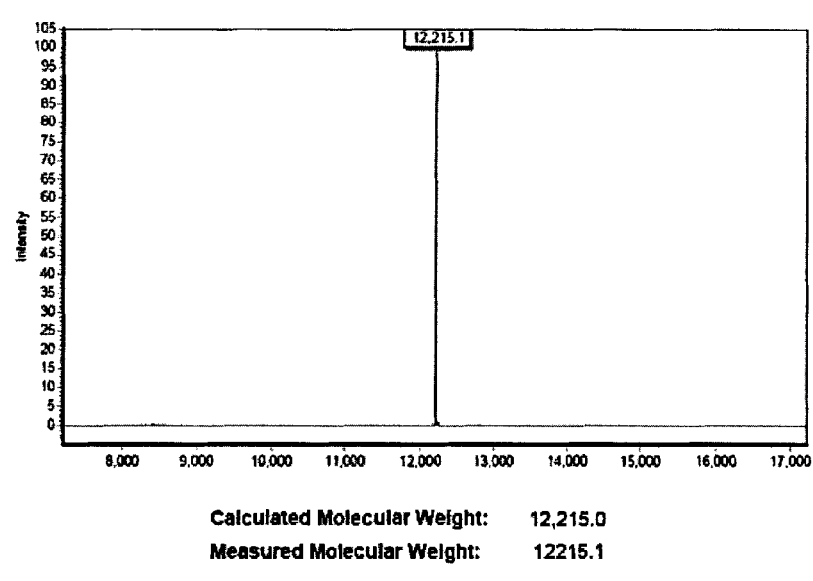
FIG. 3 is an electro spray ionization (ESI) mass spec trace of a synthesized oligomer described in Example 1 from Oligo HTCS-2K Advantage system from Novatia. The ESI trace demonstrates the purity achieved using the colored supports.
Figure 4A:
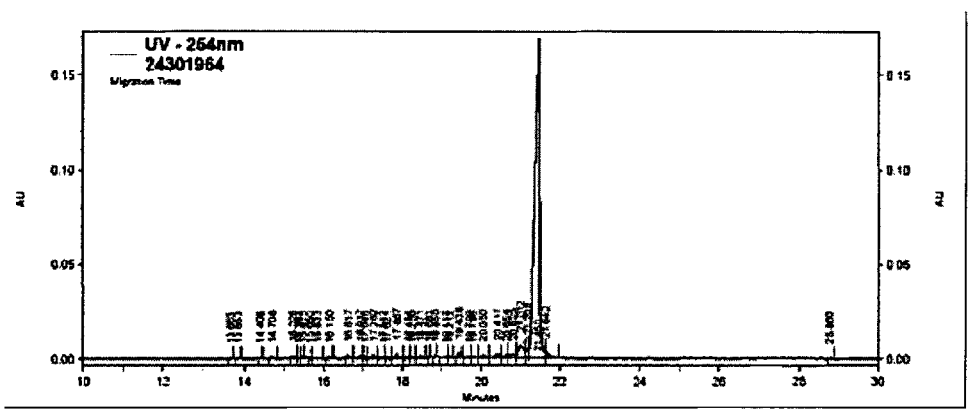
FIG. 4A is a capillary electrophoresis trace of a synthesized oligomer described in Example 1 performed on a Beckman P/ACE MDQ.

A 40-mer oligonucleotide (SEQ ID NO:1) was synthesized from a 5'-dimetoxytrityl dC(N-Bz) derivatized permanently colored membrane as described above. The oligomer was prepared according to standard phosphoramidite synthesis methods. The oligomer possessed a correct mass of about 12,215 Da, as determined by using OligoHTCS-2k Advantage ESI system from Novatia (FIG. 3). The purity of the oligomer was determined on Beckman P/ACE MDQ capillary electrophoresis (CE) system (FIG. 4). The ESI mass spec trace in FIG. 3 and the P/ACE MDQ results of FIG. 4 illustrate the purity and quality of the oligomer obtained with the supports.
SEQ ID NO: 1 5'AACCTACTCTTGAACTATCTAAT-GATGGCTGATGCCGACC-3'

The above LCAA membrane derivatization was performed by standard CPG derivatization methods available in the literature (see for example "Solid Phase Supports for Oligonucleotide Synthesis," Methods in Molec. Biol., vol. 20: Protocols for Oligonucleotides and Analogs, p. 465 (Agrawal, Ed. Humana Press (1993)) with 5'-dimetoxytrityl dC (N-Bz) 3'-O-succinyl hemiester, producing membranes with loading of at least 50 nmol as detected by trityl analysis.

Two other mixtures were prepared from a different 5'-dimetoxytrityl dC(N-Bz) CPG that contained 0.5 or 0.1% of the same red beads. The obtained mixtures were pale-pink with red specs or off-white with red specs, respectively. The loadings determined by trityl method were practically identical: 29.58 (starting CPG), 30.05, and 29.59 nmol/mg, respectively; the expected differences due to the color coding beads addition turned out to be lower than the sensitivity limit of the method.

Thus obtained mixtures and control CPG were loaded into four columns each (~16.5 mg) and the columns used for the synthesis of 20-mer oligonucleotides (SEQ ID NO: 2) using a standard phosphoramidite method.
SEQ ID NO: 2 5'-GCACTTCAGGCTCCTGGGCC-3'

All oligomers possessed correct mass of about 6070 Da, as determined by using OligoHTCS-2k Advantage ESI system from Novatia. The purity of oligomers was determined on Beckman P/ACE MDQ capillary electrophoresis system. The results presented in the Table 1 (yield about 50% of theoretical, average coupling efficiency over 99%, N−1 less that 1.4) did not show any negative effect due to the presence of the colored beads in the columns. Variation in yield, full-length product %, N−1% and coupling efficiencies were within expected value ranges and represented no significant difference.

TABLE 1

Results of Colored Polymer Synthesis

| Mg CPG/ column | Calculated loading, nmol/column | Yield, OD | Yield, Nmol | Yield % | Full length product | N-1 | Coupling efficiency |
|---|---|---|---|---|---|---|---|
| Control | | | | | | | |
| 16.4 | 508.4 | 46.2 | 265.1 | 52.14% | 83.20% | 1.00% | 99.04% |
| 16.5 | 511.5 | 45.9 | 263.3 | 51.48% | 83.20% | 0.90% | 99.04% |
| 16.4 | 508.4 | 45.9 | 263.3 | 51.80% | 82.40% | 1.20% | 98.99% |
| 16.4 | 508.4 | 45.5 | 261.0 | 51.35% | 83.10% | 0.90% | 99.03% |
| | Average | 45.88 | 263.2 | 51.69% | 82.98% | 1.00% | 99.02% |
| 0.5% Red beads | | | | | | | |
| 16.4 | 505.858 | 45.55 | 261.3 | 51.66% | 83.70% | 1.00% | 99.07% |
| 16.4 | 505.858 | 43.5 | 249.6 | 49.34% | 84.00% | 1.00% | 99.09% |
| 16.6 | 512.027 | 45.15 | 259.0 | 50.59% | 84.40% | 0.90% | 99.11% |
| 16 | 493.52 | 42 | 241.0 | 48.83% | 84.30% | 1.20% | 99.11% |
| | Average | 44.05 | 252.7 | 50.10% | 84.10% | 1.03% | 99.09% |
| 0.1% Red beads | | | | | | | |
| 16.8 | 520.2792 | 46.4 | 266.2 | 51.17% | 83.90% | 1.00% | 99.08% |
| 16.5 | 510.9885 | 45.9 | 263.3 | 51.54% | 83.70% | 1.30% | 99.07% |
| 16.6 | 514.0854 | 45.25 | 259.6 | 50.50% | 84.00% | 1.60% | 99.09% |
| 16.6 | 514.0854 | 44.75 | 256.7 | 49.94% | 82.50% | 1.40% | 98.99% |
| | Average | 45.58 | 261.5 | 50.79% | 83.53% | 1.33% | 99.06% |

Thus by changing the concentration of red colored particles, it was possible to code the oligonucleoside base (dC) by red specs, with easily distinguishable "pink" and "off-white" color coding options; that can be used for coding different protective groups (for example N-acetate vs. N-benzoate), CPG particle sizes or loading levels.

EXAMPLE 2

Manufacturing of Supports with Added Particles of Different Colors

To achieve better color discrimination, for example by shifting resulting colors away from each other while using color-recognition software, a combination of colors can be used. About 150,000 membranes were produced by the method described in the Example 1 from 450 g of LCAA CPG, 1709.5 g of UHMW PE 5382W, 22.6 g of Enzer Green beads and 8.63 g of Yellow beads. The beads appeared green with some yellow tint. Compared to the membranes produced without the yellow beads (replaced with 5382W polyethylene), the area corresponding to the "green" membranes on the computer screen of the color recognition software are shifted toward the "yellow" region, thus increasing the narrow gap between itself and the "blue" region while reducing the (initially) substantially larger gap between the "green" and the "yellow" regions.

Alteration of the appearance of membranes without substantial change of the software color recognition patterns: 450 g of LCAA CPG from Prime Synthesis, 1658 g of UHMW polyethylene 5382W from Shamrock Technologies, and 17.26 g of Scarlet Red plastic beads from Innotek Powder Coatings (fraction 75-125 µm) and 5.325 g of black Plastcoat PPA 571 beads (fraction 125-180 µm), were converted into membranes as in Example 1. The resulting membranes possessed a light-red color with visible black specks and appeared darker than membranes produced as in Example 1. The black specks were clearly visible by human eye but can be altered to an amount to be undetectable by color recognition software. Alternatively, the addition of black specks can be detected by color recognition software, allowing for color shifts that would result in more possible combinations.

EXAMPLE 3

Manufacturing of Restrictive Frits

This example demonstrates the manufacturing of restrictive frits. UHMW polyethylene from Shamrock Technologies 5380W, was packed into wells of a plate with the plate surface covered with Nickelon. The plate was covered with a flat plate, the plates were clamped, heated to 160-161° C., and cooled to 40° C. or lower temperature. The top of the plate containing the wells was cleaned by scraping, the frits were removed from the plate and then the frits were cleaned of particulates inside a fluidized bed apparatus. Thus obtained frits with an average diameter of 4.3 mm and thickness of ~2.4 mm when inserted into a 96-well plate with well diameter of 4.0 mm, retain some acetonitrile in all wells for at least 15 sec after 0.105 mL of acetonitrile was added to each of the wells.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A composition for performing oligonucleotide synthesis comprising a mixture of controlled pore glass and a thermoplastic polymeric material, said thermoplastic polymeric material comprising powder or beads or a mixture of powder and beads, wherein the mixture is heated to form a membrane.

2. The composition of claim 1 wherein the thermoplastic polymer is a polyene.

3. The composition of claim 2 wherein the polyene is a polyethylene or a polypropylene.

4. The composition of claim 1 further comprising a component that is capable of distinguishing said composition for performing oligonucleotide synthesis from a second composition for performing oligonucleotide synthesis, said second composition having an attached functional group that is different from a functional group attached to the first composition.

5. The composition of claim 4 wherein the component is a colored polymer.

6. The composition of claim 4 wherein the component is a dye.

7. The composition of claim 4 wherein the component is comprised of one or more magnetic beads.

8. The composition of claim 4 wherein the component is an inert filler.

9. A composition for oligonucleotide synthesis, comprising a support for oligonucleotide synthesis with zero, one or more functional groups attached to said support's surface, wherein the support is comprised of ultra high molecular weight polyethylene powder or beads and controlled pore glass.

10. The composition of claim 9 wherein the composition also comprises a tagging component to identify functional groups.

11. The composition of claim 10 wherein the tagging component is a colored polymer.

12. The compositions of claim 9 wherein the composition also comprises a tagging component to identify a scale of loading.

13. The compositions of claims 8, 9 or 11 wherein the support also contains a linear low molecular weight polyethylene.

14. A composition for biopolymer synthesis comprising a synthesis support and a colored particle, said colored particle corresponding to a specific functional group derivatized to the support.

15. The composition of claim 9 wherein the composition also comprises a tagging component to differentiate between a set of supports with different universal linkers.

16. The composition of claim 1 wherein the thermoplastic polymeric material serves as a tagging component.

17. The composition of claim 5 wherein the colored polymer comprises less than 3% of the total composition.

18. The composition of claim 1 wherein the controlled pore glass and the thermoplastic polymeric material are in a biopolymer synthesis column.

* * * * *